United States Patent [19]

Hewko

[11] Patent Number: 5,026,111
[45] Date of Patent: Jun. 25, 1991

[54] VEHICLE DOOR STRUCTURE WITH IMPROVED ENERGY ABSORPTION CHARACTERISTICS

[75] Inventor: Marc D. Hewko, Canton, Mich.

[73] Assignee: Excel Industries, Inc., Elkhart, Ind.

[21] Appl. No.: 422,006

[22] Filed: Oct. 16, 1989

[51] Int. Cl.$^5$ .......................................... B60R 27/00
[52] U.S. Cl. .................................................. 296/146
[58] Field of Search ................ 296/146, 188, 189; 49/502

[56] References Cited

U.S. PATENT DOCUMENTS

| | | | |
|---|---|---|---|
| 3,718,364 | 2/1973 | Fischer et al. | 296/146 X |
| 3,829,149 | 8/1974 | Stevens | 296/189 |
| 3,868,796 | 3/1975 | Bush | 296/146 X |
| 4,651,470 | 3/1987 | Imura et al. | 296/146 X |
| 4,838,606 | 6/1989 | Furubayashi et al. | 296/146 X |
| 4,901,500 | 2/1990 | Wycech | 296/146 X |
| 4,919,473 | 4/1990 | Laimighofer et al. | 296/189 X |

FOREIGN PATENT DOCUMENTS

| | | | |
|---|---|---|---|
| 1962279 | 2/1979 | Fed. Rep. of Germany | 296/146 |
| 2424825 | 1/1980 | France | 296/146 |
| 47254 | 3/1982 | Japan | 296/191 |
| 122224 | 7/1983 | Japan | 296/146 |
| 183315 | 10/1983 | Japan | 296/146 |
| 34921 | 2/1984 | Japan | 296/146 |
| 2191156 | 12/1987 | United Kingdom . | |

Primary Examiner—Margaret A. Focarino
Assistant Examiner—Joseph D. Pape

[57] ABSTRACT

A hollow beam is disclosed for a vehicle door assembly which is configured to collapse upon a transverse impact to absorb impact energy, thus reducing the impact forces experienced by a vehicle occupant during a collison. The energy absorbing beam is configured as a parallelogram in cross-section so as to enable the beam to act as a four-bar linkage during collapse. The energy absorbing beam is preferably disposed in the door assembly at the vehicle beltline which is often impacted by the occupant's head or torso during a vehicle collision. Various features can be added to the provide localized stiffening of the beam as necessary depending upon the particular beam application.

20 Claims, 5 Drawing Sheets

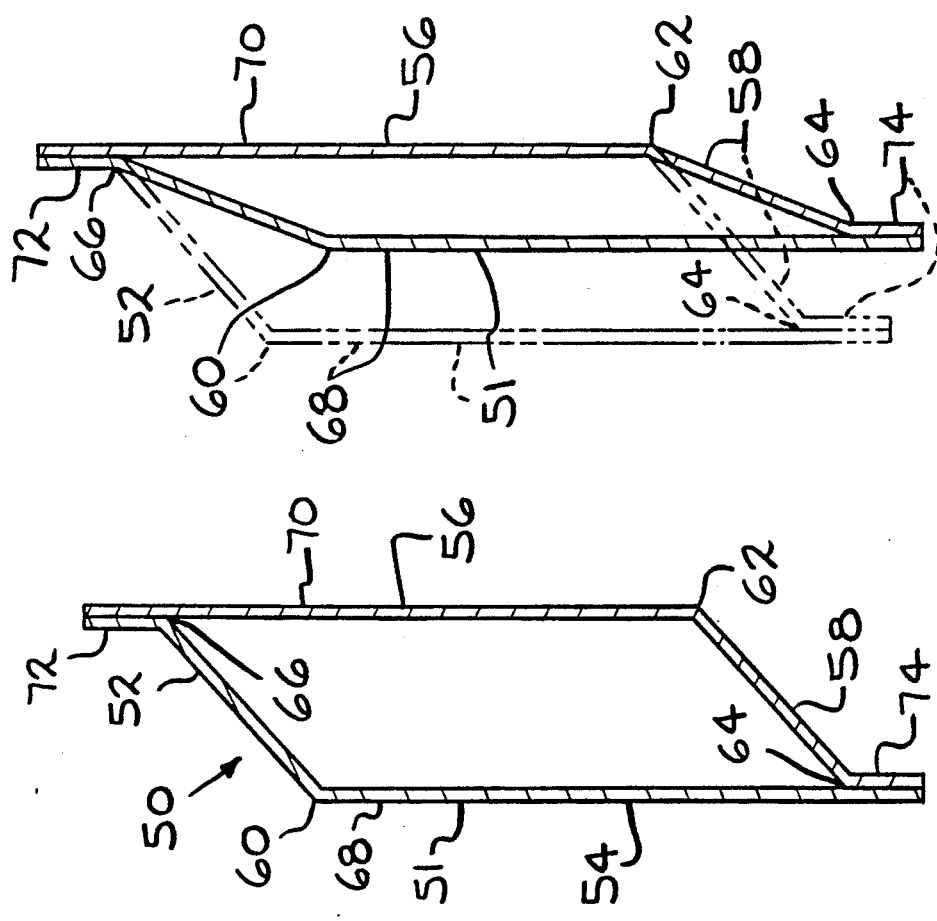

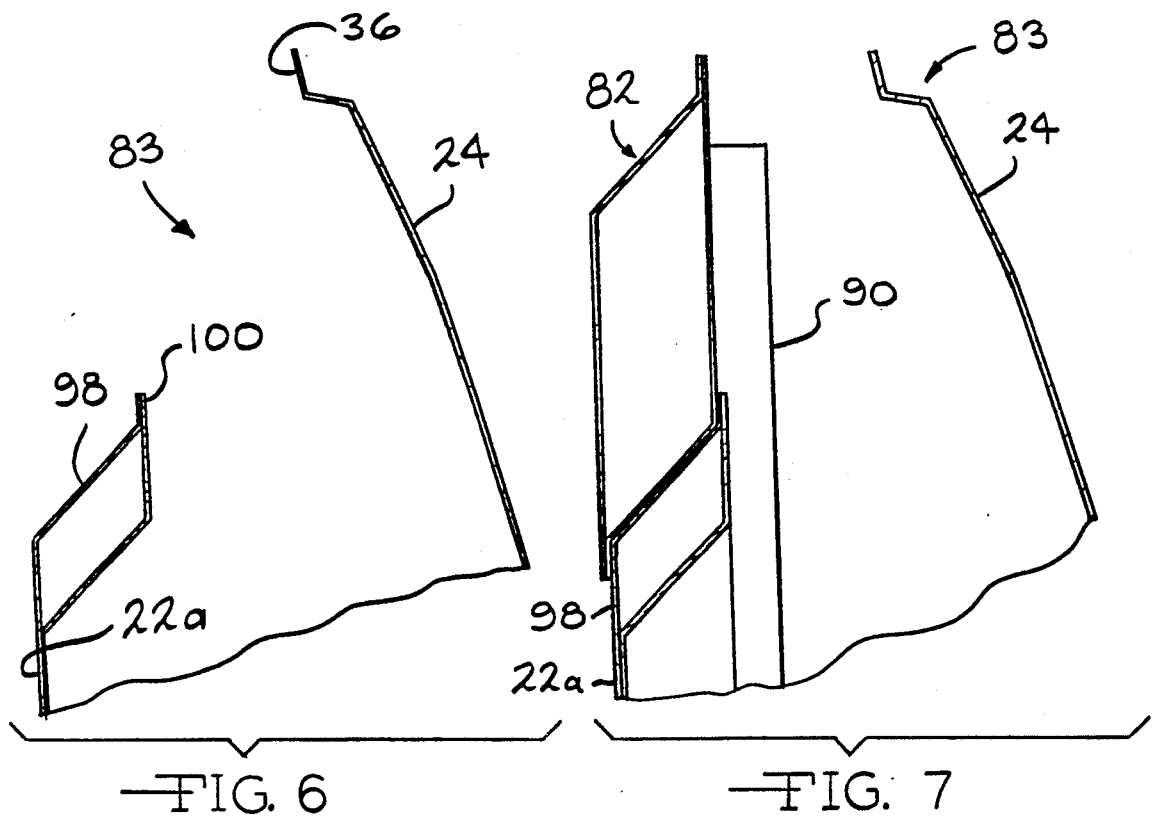
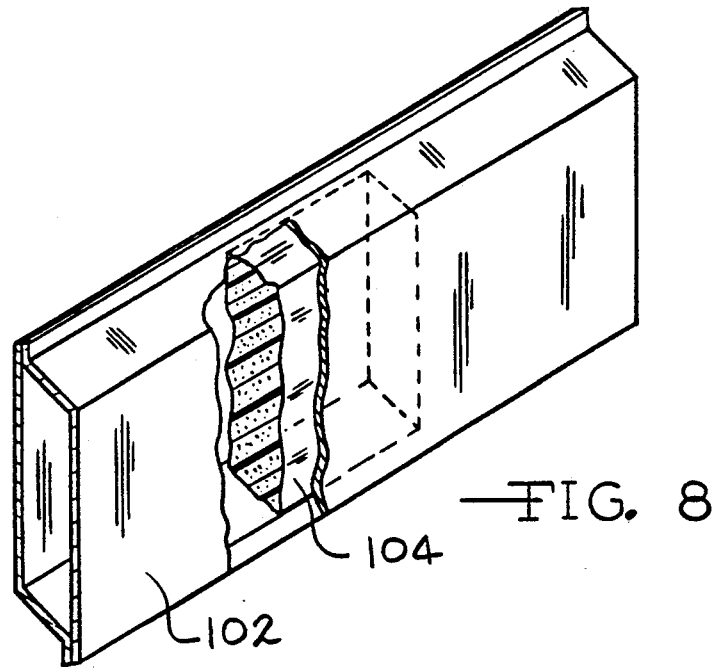

VEHICLE DOOR STRUCTURE WITH IMPROVED ENERGY ABSORPTION CHARACTERISTICS

BACKGROUND AND SUMMARY OF THE INVENTION

This invention relates to an energy absorbing beam and more particularly to a beam in a vehicle door structure intended to absorb impact energy when a vehicle occupant impacts the interior of the door during a collision.

During a vehicle collision, the occupants in the vehicle will often impact interior components of the vehicle and thereby receive injuries. During a side impact collision, the occupants are often thrust sideways into the door. In an effort to reduce injuries from impacting the door, the Federal Government has proposed regulations requiring energy absorbing features to reduce the impact force experienced by the occupants and thus eliminate injury or reduce its severity.

The present invention is intended to increase the energy absorption of a vehicle door by providing a hollow beam extending longitudinally through the door structure that is configured to collapse upon impact in a predetermined manner to absorb energy. The beam collapses before substantial transverse deflection of the beam caused by the impact. In cross-section, the beam is a parallelogram that bends at the four corners upon impact to collapse the beam, thus absorbing energy. The particular dimensions of the beam can be varied depending on the particular application of the beam and the door length.

The beam can be incorporated into a conventional door assembly having an inner panel and door skin with a window regulator, latch mechanism, etc. mounted to the panel. In addition, the beam can be incorporated into a functional door cartridge which carries the window regulator, latch, etc. and is positioned between the inner panel and skin. The beam can include stiffening ribs to strengthen the beam as necessary, while additional energy absorbing materials can be placed within the beam or on the beam exterior facing the vehicle occupants. These and other modifications are all within the purview of the invention.

Further objects, features and advantages of the invention will become apparent from a consideration of the following description and the appended claims when taken in connection with the accompanying drawings.

BRIEF DESCRIPTION OF THE DRAWINGS

FIG. 3 is a cross-sectional view of the energy absorbing beam of the present invention;

FIG. 4 is a cross-sectional view of the energy absorbing beam of FIG. 3 illustrating the beam in a partially collapsed condition;

FIG. 6 is a cross-sectional view of a door assembly configured for use with the functional door cartridge of FIG. 5;

FIG. 7 is a cross-sectional view of the door assembly shown in FIG. 6 with the functional door cartridge of FIG. 5 installed in the door cavity;

FIG. 8 is a perspective view of the energy absorbing beam of the present invention with a portion cut away to illustrate an energy absorbing or a structural foam block within the beam;

DETAILED DESCRIPTION OF THE PREFERRED EMBODIMENT

Figure 1:
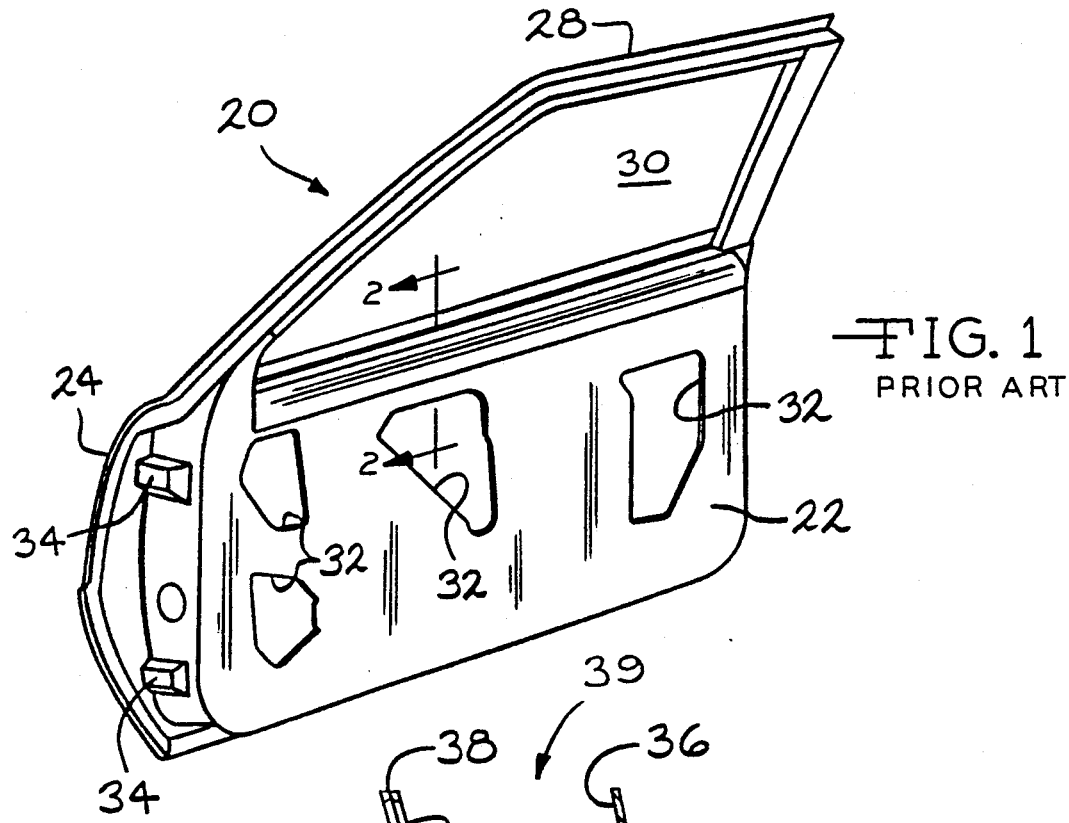
FIG. 1 is a perspective view of a prior art door assembly.

A typical vehicle door assembly is shown in FIG. 1 and indicated generally at 20. The door assembly 20 includes an inner door panel 22 and an exterior door skin 24 spaced outwardly from inner panel 22 forming an interior door cavity 26 therebetween. A window frame 28 extends above the inner panel 22 and door skin 24 to form a window opening 30. A window glass, not shown, is movable between a raised position closing window opening 30 and a lowered position within door cavity 26. A window regulator to raise and lower the glass, a door latch and a lock mechanism (not shown) are disposed within cavity 26 and accessible through one or more openings 32 in the inner door panel 22. Door assembly 20 is mounted to a vehicle body by hinges attached to mounting bosses 34 on the forward edge of the door assembly.

Figure 2:
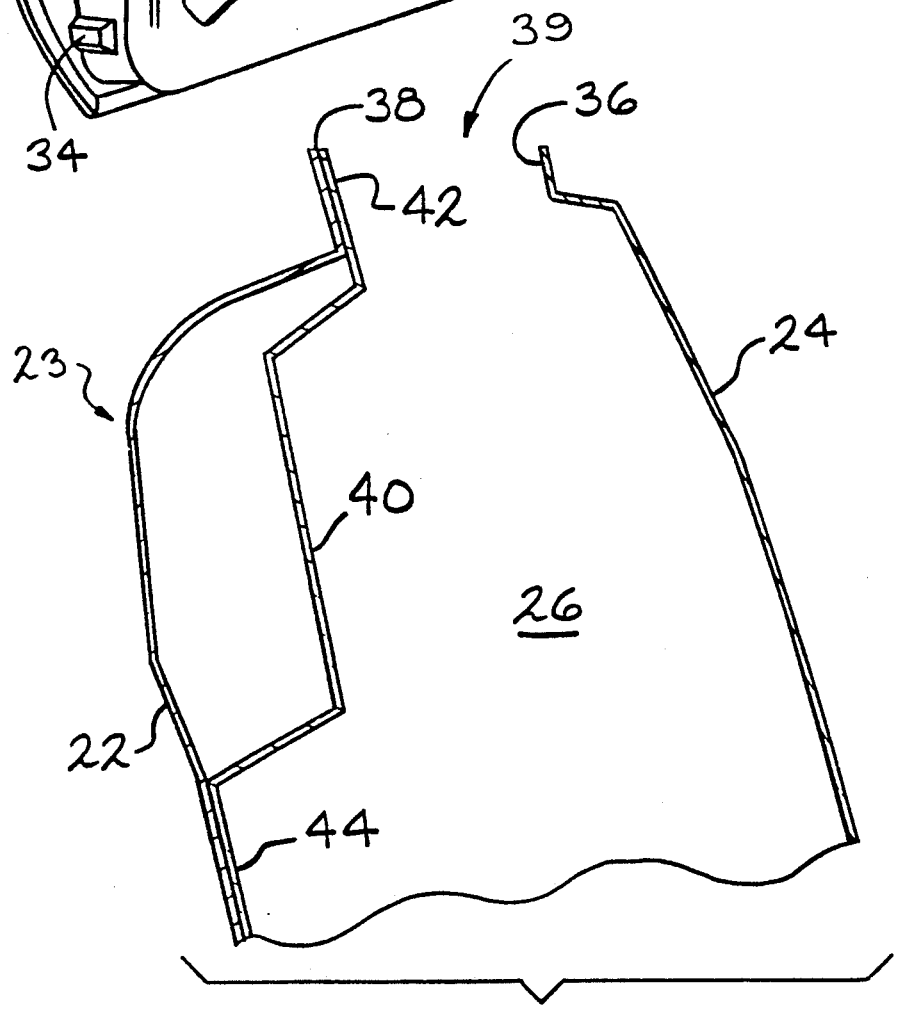
FIG. 2 is a cross-sectional view of the door assembly as seen from substantially the line 2—2 of FIG. 1.

FIG. 2 is a cross-sectional view of the upper portion of door assembly 20 showing a typical prior art door construction. The upper end 36 of door skin 24 and upper end 38 of inner panel 22 are spaced from one another to provide an opening 39 through which the window glass extends. The upper end of inner panel 22 is strengthened by the addition of a second sheet metal panel 40 which is attached to inner door panel 22 along its upper end 42 and its lower end 44 by spot welding or other similar means. Sheet metal panel 40 and inner door panel 22 cooperate to form a hollow beam 23 along the upper end of panel 22 to provide strength and stiffness to the inner door panel.

The beam 23 shown in FIG. 2 is positioned at what is referred to as the "beltline" portion of the door assembly. The top of the door assembly along the bottom of the window opening is called the "beltline" because it is generally at the height of a person's belt when standing alongside the vehicle. During a side impact collision, it is the door beltline that is often impacted by a vehicle occupant. The occupant strikes the beltline with his or her head or upper torso. The present invention replaces the irregularly shaped hollow beam 23 shown in FIG. 2 with a beam 50 shown in FIG. 3 that is intended to collapse upon impact to absorb energy, thus reducing the impact forces experienced by the vehicle occupant.

Energy absorbing beam 50 is shaped as a parallelogram 51 when viewed in the cross-section shown in FIG. 3. Beam 50 includes a top wall 52, inner wall 54, outer wall 56, and a bottom wall 58. The terms inner and outer when used with the beam walls refer to the orientation of the beam in the vehicle door. The inner wall faces the interior of the vehicle while the outer wall faces the exterior of the vehicle. Inner wall 54 and outer wall 56 are parallel with one another and generally upright while top wall 52 and bottom wall 58 are parallel inclined walls, sloping downwardly in a direction from the outside of the vehicle. The intersection of top wall 52 with inner wall 54 at corner 60 forms an obtuse angle equal to the angle formed at corner 62 at the intersection of walls 56 and 58. The other two angles of the parallelogram 51 are by definition acute angles, these being at corner 64 at the intersection of bottom wall 58 and inner wall 54 and corner 66 at the intersection of top wall 52 and outer wall 56.

In the preferred embodiment, the energy absorbing beam 50 is construction of two sheet metal panels interior panel 68 and exterior panel 70 shown in FIG. 3. However, other constructions of beam 50 are within the purview of the invention for example, beam 50 can be formed of a single piece of sheet metal integral with inner door panel 22. As shown in the Figures, interior sheet metal panel 68 forms inner wall 54 and top wall 52 and is bent at corner 60 at the intersection of the inner and top walls. Sheet metal panel 68 is also bent at corner 66 at the intersection of the outer wall and top wall and continues upwardly, beyond corner 66 forming a flange 72 parallel to inner wall 54. Flange 72 is used to attach sheet metal panel 68 to sheet metal panel 70. Exterior panel 70, which forms outer wall 56 and bottom wall 58, is shaped identically to interior panel 68. Panel 70 is bent at corner 62 at the intersection of outer wall 56 and bottom wall 58. Panel 70 is bent again at corner 64 at the intersection of the bottom wall and inner wall and continues downward beyond the bottom wall, forming a flange 74 for attaching exterior panel 70 to interior panel 68 at the bottom of the parallelogram. The panels 68 and 70 can be attached to one another through flanges 72 and 74 by any suitable means. including, but not limited to, welding, riveting, adhesive or the like. Exterior panel 70 is inverted relative to the interior panel 68.

During a vehicle collision, when an occupant strikes the energy absorbing beam 50, the beam 50 will deflect as shown in FIG. 4 from the broken line position to the solid line position. The shape of parallelogram 51, by having an upwardly and outwardly inclined top wall 52 and generally upright inner wall 54 forming an obtuse angle at the intersection 60 enables the parallelogram to collapse by increasing the intersection angles at corners 60 and 62 while the intersection angle at corners 64 and 66 decrease. Beam 50 is intended to absorb a portion of the impact energy as a result of bending at its four corners. The impact force experienced by the vehicle occupant is thus reduced.

Figure 9:
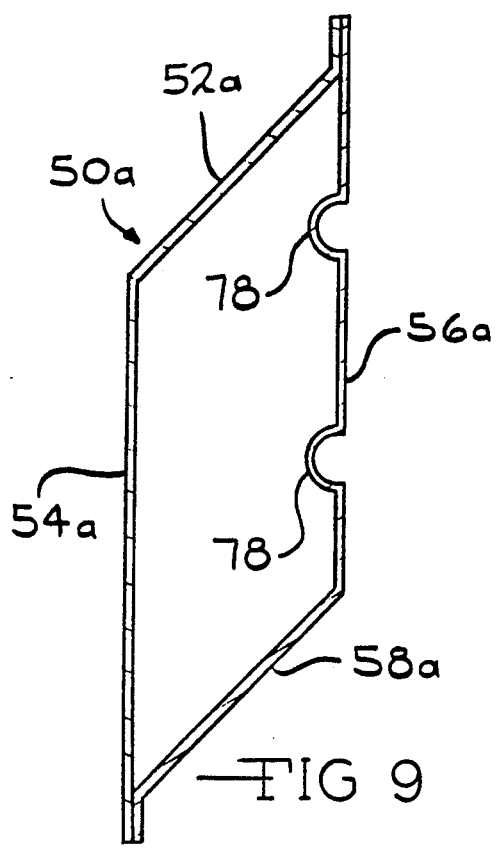
FIG. 9 is a cross-sectional view of a modified form of the energy absorbing beam including stiffening ribs.

Preferably the outer wall 56 will remain stationery during beam collapse with the inner wall 54 moving outward toward the outer wall 56. To achieve this, the exterior sheet metal panel 70 can be made stiffer than the interior sheet metal panel 68. This can be done by utilizing thicker sheet metal for panel 70 than for interior panel 68 or by placing stiffening ribs in outer wall 56 such as ribs 78 extending longitudinally along outer wall 56 as shown in FIG. 9.

Figure 5:
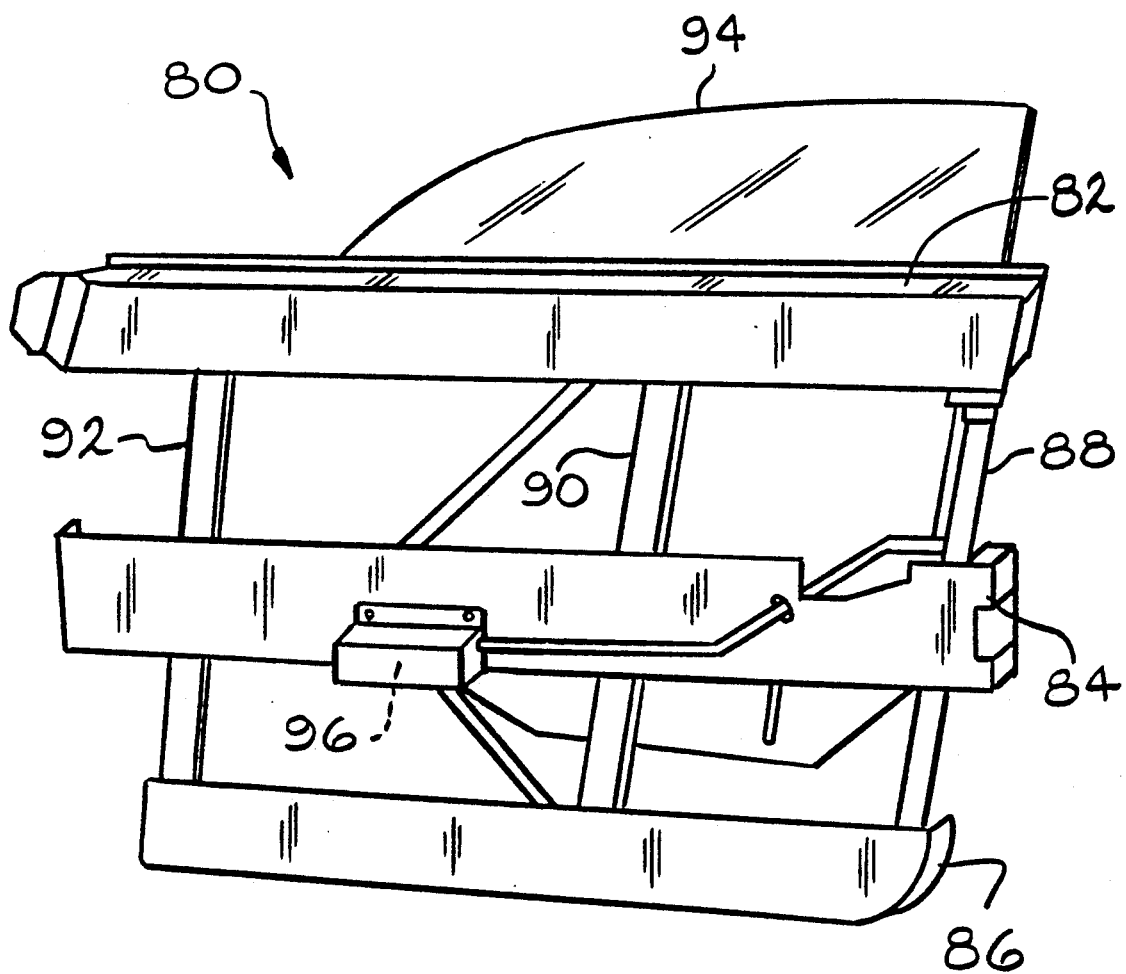
FIG. 5 is a perspective view of a functional door cartridge including an energy absorbing beam of this invention.

The energy absorbing beam 50 can be incorporated into a conventional door assembly such as door assembly 20 of FIG. 1 or it can be incorporated into a functional door cartridge as shown in FIG. 5. The functional door cartridge 80 includes a skeleton frame having a number of upright support members and generally horizontal cross members. The cross members include upper cross member 82, intermediate cross member 84 and lower cross member 86 while the upright support members include forward support 92, middle support 90, and aft support 88. The door cartridge 80 carries the window glass 94 and includes a window regulator mechanism 96 for raising and lowering the glass. The door cartridge can also include the door latch and door lock hardware (not shown). Door cartridge 80 is functionally similar to the door cartridge disclosed in U.S. patent application Ser. No. 177,765 filed Apr. 5, 1988 and incorporated herein by reference. The upper cross member 82 is configured like energy absorbing beam 50 to incorporate energy absorbing features into the functional door cartridge.

FIG. 6 is a cross-sectional view of a door assembly 83 through the door belt line. Door assembly 83 is configured for use with functional door cartridge 80. The inner door panel 22a terminates at its upper end in a smaller energy absorbing beam 98 that is incorporated into panel 22a to provide support to the inner panel prior to finished assembly. The space between the upper end 100 of beam 98 and upper end 36 of door skin 24 is large enough to enable functional door cartridge 80 to be inserted into the interior cavity of the door.

FIG. 7 is a cross-sectional view of door assembly 83 after the function door cartridge 80 has been installed in the door assembly. Energy absorbing upper cross member 82 of the door cartridge is positioned atop the smaller energy absorbing beam 98 in door panel 22a. Both beams 82 and 98 are intended to collapse upon impact in the same manner as beam 50 to absorb energy and reduce the impact force.

The length of the energy absorbing beam is an important factor in designing the beam to have the proper energy absorbing characteristics. If the beam length is to large, the beam may deflect upon impact before collapse of the beam occurs. This would reduce the energy absorption of the beam. To reduce deflection of a long beam, localized stiffening can be added to the beam. This localized stiffening can include stiffening ribs such as ribs 78 in the beam 50a shown in FIG. 9. The beam can also be stiffened by a crushable foam block between the inner and outer walls of the beam such as the foam block 104 shown in FIG. 8 in the interior of the beam 102. By placing foam block 104 in the center of the beam, the block 104 can be used to resist buckling of a long beam caused by column loading of the beam. The door assembly is preferably designed to carry a minimum column load without buckling. This is necessary to prevent buckling of the door assembly during a collision in which the door is loaded in compression along its longitudinal length.

Figure 12:
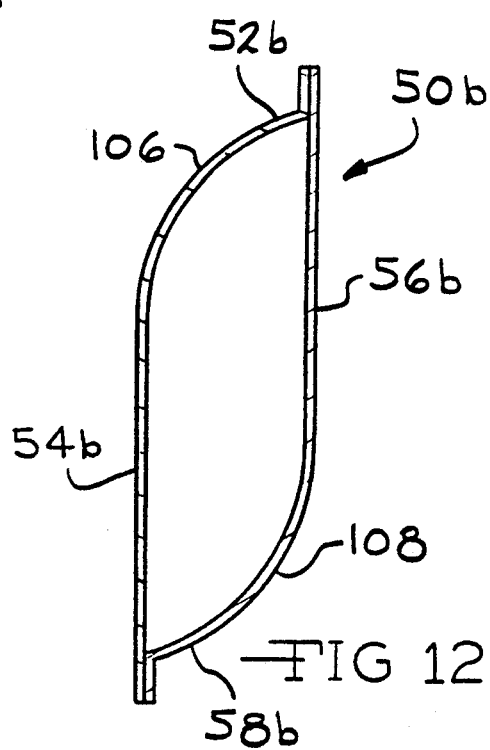
FIG. 12 is a cross-sectional view of a modified form of the energy absorbing beam with the corner exposed to the occupant smoothed to a curved surface.

The particular shape and dimensions of the parallelogram forming the energy absorbing beam can be varied depending upon the particular application, i.e. the required buckling load, door length etc. One modification is shown in FIG. 12. In a door assembly in which the energy absorbing beam is exposed in the vehicle occupant space, the general shape of the parallelogram can be varied to replace the corners 60 and 62 with relatively large radius bends 106 and 108 to provide a more rounded beam surface.

Figure 10:
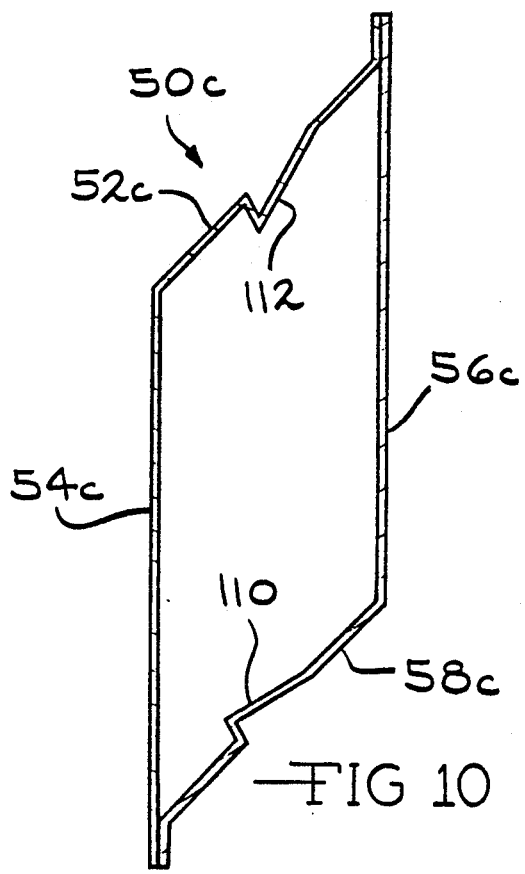
FIG. 10 is a cross-sectional view of a modified form of the energy absorbing beam including collapsing darts.

Other modifications to the beam can include collapsing darts 110 and 112 in walls 52c and 58c in beam 50c shown in FIG. 10. The top and bottom walls will bend at the darts enabling the beam to collapse more easily upon impact.

Interior panel 68 and exterior panel 70 can be attached to one another by several methods such as spot or projection welding, seam welding, structural foam tape, structural transfer tape, high-performance contact adhesives, etc. The beam may also be constructed of a single sheet metal panel rather than two and integrally formed with the door assembly inner panel 22.

In the preferred embodiment, the energy absorbing beam is located at the beltline. However, the beam is not limited to this location and can be placed elsewhere in the door assembly.

Figure 11:
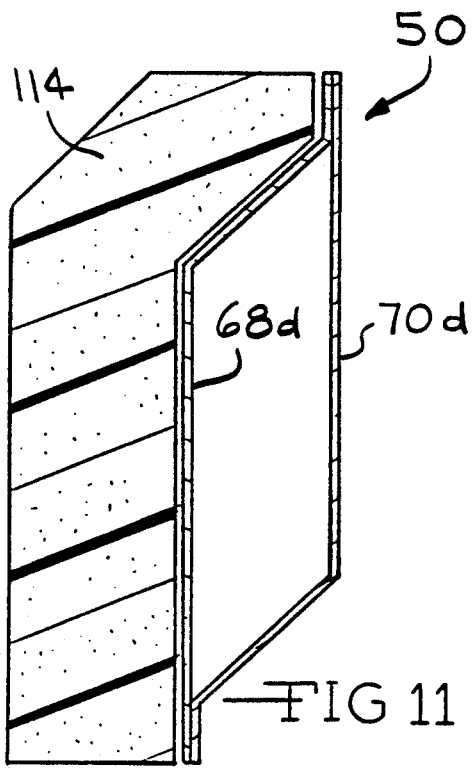
FIG. 11 is a cross-sectional view of the energy absorbing beam including an energy absorbing pad on the exterior of the beam.

If necessary, additional energy absorbing material such as foam can be added to the exterior of the beam. An example of this is shown in FIG. 11 with a foam body 114 attached to the interior sheet metal panel 68 of beam 50d. The additional energy absorbing material 114 can be added directly to the beam or it can be attached to an accompanying trim panel covering the beam.

The energy absorbing beam of the present invention acts as a four-bar linkage system with the low wall serving as the links. The beam is intended to collapse upon lateral impact by bending at the intersections of the four walls with each other. After collapse of the beam, the beam is intended to deflect laterally to absorb additional energy. As a result of the energy absorption of the beam, the impact forces experienced by a vehicle occupant are reduced, reducing the severity of injury.

The energy absorbing door beam of the present invention can be incorporated into a door assembly in one of several ways. The beam can be a part of a functional door cartridge. The beam can be integrally formed with the door inner panel in a manner similar to the prior art hollow beam 23 shown in FIG. 2 with a portion of the inner panel forming a part of the beam. The beam can also be a separate component installed in the door assembly. The only requirement for the beam is that it be collapsible upon impact to absorb the impact energy.

It is to be understood that the invention is not limited to the exact construction illustrated and described above, but that various changes and modifications may be made without departing from the spirit and scope of the invention as defined in the following claims.

I claim:

1. A vehicle door assembly comprising:
a generally upright exterior door skin;
a generally upright inner door panel spaced inwardly from said door skin forming a cavity therebetween;
a generally horizontal beam extending longitudinally of said door assembly adjacent said inner door panel, said beam including inner and outer substantially parallel walls spaced from one another with the top edges of said inner and outer walls connected by a top wall and the bottom edges of said inner and outer walls connected by a bottom wall forming a hollow beam formed of said walls joined together along the longitudinal edges of said walls forming corners of said beam, said beam being collapsible upon a predetermined transverse impact by bending at said corners to reduce the space between said inner and outer walls whereby said beam absorbs energy to reduce the impact force experienced by a vehicle occupant striking said inner door panel.

2. The door assembly of claim 1 wherein said hollow beam is a parallelogram in transverse cross section, said beam acting as a four-bar linkage during collapse by bending at said corners.

3. The door assembly of claim 1 wherein said inner and outer beam walls are generally upright and said top and bottom walls are substantially parallel to one another and inclined downwardly from said outer wall toward said inner wall.

4. The door assembly of claim 1 wherein said beam is disposed along the upper portion of said door assembly.

5. The door assembly of claim 1 further comprising a functional door cartridge disposed within said cavity, said cartridge including a plurality of spaced generally horizontal cross members and a plurality of spaced generally upright supports connected to said cross members to form a frame structure, said hollow beam serving as one of said cross members.

6. The door assembly of claim 5 wherein said hollow beam is the uppermost cross member of said door cartridge.

7. The door assembly of claim 6 wherein said inner door panel includes a second hollow beam along the horizontal top edge of said inner door panel to strengthen said panel prior to installation of said functional door cartridge and to collapse upon impact to absorb additional energy.

8. The door assembly of claim 7 wherein the uppermost cross member of the functional door cartridge is positioned above said second beam with the bottom wall of said uppermost cross member vertically above the top wall of the second beam.

9. An energy absorbing collapsible beam for a vehicle door assembly wherein the door assembly includes an exterior door skin and an inner door panel spaced from said door skin forming a cavity therebetween, said beam comprising:
inner and outer generally upright walls spaced from one another;
a top wall connecting the longitudinal top edges of said inner and outer walls; and
a bottom wall connecting the longitudinal bottom edges of said inner and outer walls so that said beam is hollow and has corners at the intersections of said walls;
said beam extending longitudinally of said door assembly and said beam being collapsible upon a predetermined transverse impact by bending at said corners to reduce the space between said inner and outer walls whereby said beam absorbs energy to reduce the impact force experienced by a vehicle occupant striking said inner door panel.

10. The energy absorbing beam of claim 9 wherein said hollow beam is a parallelogram in transverse cross section, said beam acting as a four-bar linkage during collapse by said walls rotating at said corners.

11. The energy absorbing beam of claim 9 wherein said top and bottom walls are inclined downwardly from said outer wall toward said inner wall.

12. The energy absorbing beam of claim 9 wherein said beam is integrally formed with said inner door panel.

13. The energy absorbing beam of claim 9 wherein said beam is disposed along the upper portion of said inner door panel.

14. The energy absorbing beam of claim 9 wherein said beam is constructed of two sheet metal panels comprising an interior panel forming said inner and top walls of said beam and an exterior panel forming the outer and bottom walls of said beam.

15. The energy absorbing beam of claim 14 wherein said interior panel terminates in a flange portion extending upwardly from said top wall parallel to said inner wall and said exterior panel terminates in a flange portion extending downwardly from said bottom wall parallel to said outer wall.

16. The energy absorbing beam of claim 15 wherein said interior and exterior panels are joined together by fastening said interior panel flange portion to said exterior panel and by fastening said exterior panel flange portion to said interior panel.

17. The energy absorbing beam of claim 15 wherein said interior panel and said exterior panel are identical, said exterior panel being inverted relative to said interior panel.

18. The energy absorbing beam of claim 9 wherein said outer wall includes at least one stiffening rib extending longitudinally of said beam.

19. The energy absorbing beam of claim 9 further comprising means for strengthening said beam to resist buckling from compressive loading of said beam.

20. The energy absorbing beam of claim 19 wherein said means includes at least one block of structural foam within said hollow beam interior.

* * * * *